(12) United States Patent
Vella

(10) Patent No.: US 11,595,432 B1
(45) Date of Patent: Feb. 28, 2023

(54) INTER-CLOUD ATTACK PREVENTION AND NOTIFICATION

(71) Applicant: Amazon Technologies, Inc., Seattle, WA (US)

(72) Inventor: Philip M. Vella, Earlwood (AU)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/915,853

(22) Filed: Jun. 29, 2020

(51) Int. Cl.
H04L 9/40 (2022.01)

(52) U.S. Cl.
CPC .... H04L 63/1458 (2013.01); *H04L 2463/141* (2013.01)

(58) Field of Classification Search
CPC .............. H04L 63/1458; H04L 2463/141
See application file for complete search history.

(56) References Cited

U.S. PATENT DOCUMENTS

| | | | | |
|---|---|---|---|---|
| 2002/0032774 A1* | 3/2002 | Kohler, Jr. | .......... | H04L 63/1408 709/225 |
| 2003/0014665 A1* | 1/2003 | Anderson | .......... | H04L 63/1458 726/4 |
| 2005/0198519 A1* | 9/2005 | Tamura | ............... | H04L 63/1408 713/188 |
| 2010/0218250 A1* | 8/2010 | Mori | .................. | H04L 63/1441 709/224 |
| 2011/0072515 A1* | 3/2011 | Park | ..................... | H04L 63/1458 709/224 |
| 2016/0381070 A1* | 12/2016 | Zhang | ................... | H04L 63/145 726/23 |
| 2017/0034220 A1* | 2/2017 | Singaraju | ............ | H04L 63/1458 |
| 2017/0223035 A1* | 8/2017 | Watanabe | ........... | H04L 63/1458 |
| 2020/0389487 A1* | 12/2020 | Zhauniarovich | ........................... | H04L 29/06925 |

FOREIGN PATENT DOCUMENTS

EP 2109280 A1 * 10/2009 ....... H04L 29/12792

* cited by examiner

*Primary Examiner* — Robert B Leung
(74) *Attorney, Agent, or Firm* — Eversheds Sutherland (US) LLP

(57) ABSTRACT

Devices, systems, and methods are provided for detecting and preventing inter-cloud attacks. A method may include determining, by a first cloud management service, a cyber attack on a second cloud management service using the first cloud management service, and determining two or more source Internet protocol (IP) addresses associated with the cyber attack. The method may include determining a response to the cyber attack, the response associated with controlling egress traffic from the first cloud management service, the egress traffic associated with the two or more source IP addresses. The method may include sending a notification to the second cloud management service, the notification including an indication of the response.

20 Claims, 6 Drawing Sheets

INTER-CLOUD ATTACK PREVENTION AND NOTIFICATION

BACKGROUND

Cloud-based services are being used more frequently by more parties and for more functions. When a cloud management service is subject to an attack, such as when systems overwhelm the bandwidth and/or resources of a system, such as a cloud-based system provided by a cloud management service. Because cloud management services are owned and maintained by different entities, different cloud management services may use different attack detection and mitigation protocols, and may use different communication protocols. Cloud management services therefore may benefit from a shared intra-cloud communication protocol.

Figure 1:
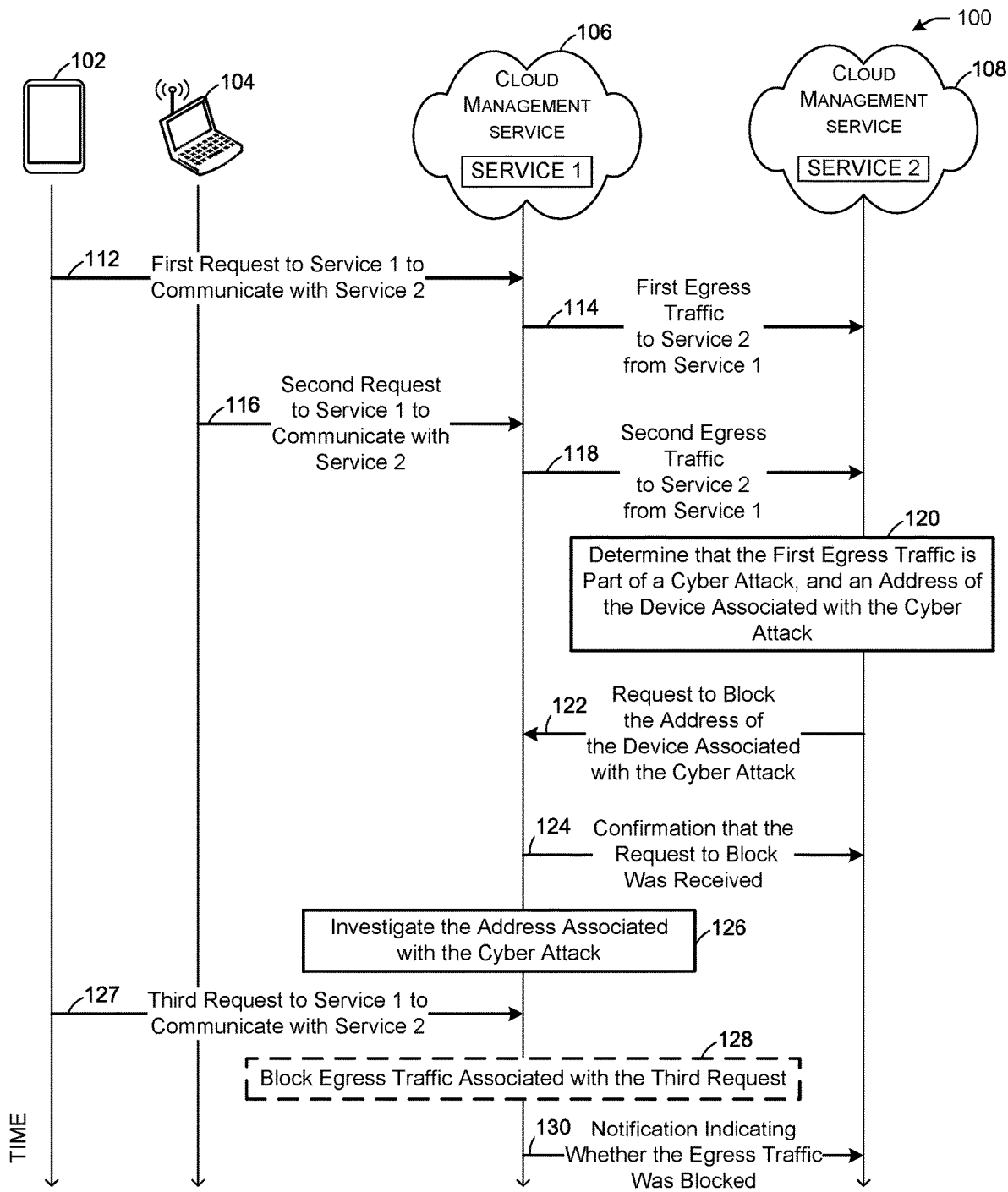
FIG. 1 illustrates an example process for detecting and preventing inter-cloud attacks, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for detecting and preventing inter-cloud attacks.

Due to more applications and services being available over networks such as the Internet, cloud computing is increasingly is being used. Cloud computing may provide access to electronic resources through services, such as web-based services, where the hardware and/or software used to provide those services may be scalable based on the resource needs of services at any given time. A user or customer may pay for cloud management services (e.g., cloud management platforms—CMPs, also referred to as network management platforms for cloud-based networks) to use cloud computing services and resources hosted and/or provided by the CMPs. A cloud management service may refer to a managed cloud-based network of services and resources. For example, a cloud management service may provide data storage services, serverless computing, elastic computing, and other services from a cloud-based product suite. Different cloud-based networks may offer different cloud-based computer resources and may be managed by respective cloud management services.

Cloud management services may be affected by distributed denial-of-service (DDoS) attacks and other types of cyber attacks (e.g., man-in-the middle attacks, phishing, drive-by attacks, password attacks, SQL injection attacks, cross-site scripting attacks, eavesdropping attacks, birthday attacks, malware attacks, etc.). A DDoS attack, for example, occurs when multiple systems overwhelm the bandwidth or resources of a targeted system, which often is a web server that implements a website or provides data for other applications. DDoS attacks may be the result of multiple systems flooding a targeted system with traffic. A resource managed by one cloud management service, such as a website, may be the target of a DDoS or other cyber attack that uses resources from another cloud management service (e.g., a cloud management service managed by another entity and/or network), such as computing instances provided by the other cloud management service and used by devices accessing the computing instances to generate the DDoS attack or other cyber attack.

While a cloud management service may detect and mitigate DDoS and other attacks perpetrated within the cloud-based network managed by the cloud management service, no current solution exists for a first cloud management service to notify a second cloud management service of an attack on one of the cloud management services using resources provided by the other cloud management service, and for the two cloud management services to coordinate with one another to mitigate the attack. For example, one cloud management service may control ingress traffic by blocking the traffic or "black holing" such traffic associated with the attack, but there currently is no protocol or standard of communication which allows on cloud management service to request another cloud management service to prevent some egress traffic (e.g., traffic from a source address and/or egress port) from the other cloud management service from reaching the requesting cloud management service.

In addition, there is currently no mechanism for one cloud management service to receive a request from another cloud management service to control egress traffic suspected as related to a DDoS or other cyber attack on the other cloud management service, and to evaluate and respond to the request. For example, a single user requesting that all egress traffic sent to a government website, such as a tax document portal when taxes are due, may be suspicious, but a request from a government entity to block egress traffic with a source address provided by the government entity may be more trustworthy and may warrant more immediate action.

Therefore, cloud management services may benefit from a protocol that facilitates communication between the cloud management services to notify the cloud management services of potential DDoS and other cyber attacks, and to facilitate the evaluation of and responses to requests to control communications that may be used in the cyber attacks.

In one or more embodiments, one cloud management service may detect a potential cyber attack. For example, the cloud management service may monitor ingress and egress traffic, including source and destination addresses of the traffic. A cloud management service may determine an amount of traffic received at any endpoint of the cloud management service, and when the amount of traffic exceeds a threshold amount of traffic, the cloud management service may flag a potential cyber attack. The cloud management service may determine whether the suspected cyber attack traffic originates from a source address that previously has been identified as suspicious, and whether cyber attack traffic uses a computer resource of another cloud management service. For example, a first cloud management service may provide to a second cloud management service (e.g., using JSON files) a list of Internet protocol (IP) addresses used by particular services or resources provided by the first cloud management service. When the second cloud management service identifies a possible cyber attack and the source IP addresses used to send traffic involved in the cyber attack, the second cloud management service may look up the source IP addresses and whether the source IP addresses are associated with any service or resource provided by the first cloud management service.

In one or more embodiments, a first cloud management service that identifies a cyber attack and source addresses used to send traffic to perpetrate the attack may generate a request to a second cloud management service whose services or resources are being used to send the traffic for the cyber attack. For example, devices at the source IP addresses for the traffic may execute computing instances in the second cloud management service for the purpose of flooding the first cloud management service (e.g., a service or resource at a first CMP) with the traffic in a cyber attack. The first cloud management service may generate the request to indicate to the second cloud management service that the first cloud management service is aware of a possible cyber attack at the first cloud management service using services or resources at the second cloud management service, and originating from devices using one or more source IP addresses. The request may identify the first cloud management service (e.g., an IP address of the endpoint used to send the request), source addresses of the perpetrators of the cyber attack, timeouts (e.g., time durations during which the first cloud management service requests the second cloud management service to restrict or black hole egress traffic from the cloud management service originated from the source IP addresses), the endpoints used to send and receive the request (e.g., respective active programming interface endpoints at the first and second cloud management services), and the respective inbound and outbound ports of the first and second cloud management services used in the transmission of the cyber attack traffic. At least some of the information in the request may be included in a JSON payload, for example.

In one or more embodiments, the second cloud management service may receive the request from the first cloud management service and determine the requesting cloud management service (e.g., the first CMP or a user of the first CMP), the IP addresses whose egress traffic from the second cloud management service is to be restricted or black holed (e.g., controlled), a trust level (e.g., a trust score) of the requesting cloud management service and/or the IP addresses to be controlled, the timeouts for controlling the egress traffic, and other relevant information. When the trust level of the requesting cloud management service exceeds a trust level threshold (e.g., such as when the requesting user is a government agency or other trusted party), the second cloud management service may implement a response to control the egress traffic from the source IP addresses. The decision of whether to implement the response based on the request received from the first cloud management service may be based on a decision flow (e.g., decision tree). For example, the decision flow may include the comparison of the trust level of the requesting cloud management service to a threshold level, and corresponding actions for when the trust level exceeds or fails to meet the threshold level. When the trust level fails to meet the threshold level, the second cloud management service may further evaluate the source IP addresses indicated in the request based on the decision tree. For example, the second cloud management service may determine an amount of egress traffic from a source IP address and whether the amount of traffic exceeds a threshold amount of traffic. When the amount of egress traffic from a source IP address exceeds the threshold amount of traffic, the decision flow may include steps for implementing a response to control egress traffic from the source IP address based on the request. When the amount of egress traffic from a source IP address does not exceed the threshold amount of traffic, the decision flow may include steps for further evaluating the source IP address for any suspicious activity (e.g., previously flagged activity, such as traffic exceeding the threshold amount of traffic or the like). The second cloud management service may evaluate a number or percentage of false positives of a source IP address (e.g., when the source IP address is indicated incorrectly as participating in a cyber attack) and whether the number or percentage of false positives exceeds a respective threshold.

In one or more embodiments, the notification protocol for cloud management services may include a confirmation (e.g., an acknowledgment) from the cloud management service that receives the request to the CMP that sent the request. The acknowledgement may notify the requesting cloud management service that the request has been received and is being processed. When a requesting CMP does not receive a confirmation, the requesting cloud management service may re-send the request or may send another similar request. In this manner, a defined communication protocol between cloud management services may allow cloud management services to communicate in an organized manner to identify and indicate cyber attacks and whether a cloud management service is responding to such an attack.

In one or more embodiments, the request may indicate to a first cloud management service that a second cloud management service does not want to receive traffic from one or more source IP addresses or that the second cloud management service wants to at least limit the traffic from the one or more source IP addresses (e.g., rate limiting) for a time (e.g., timeout). When the first cloud management service determines the response to the request, such as to block, rate limit, or black hole traffic from the one or more source IP addresses, the first cloud management service may send a notification to the second cloud management service. The notification may provide one or more indications of the response (e.g., which type of control was implemented, and at which of the one or more source IP addresses). The notification may indicate the timeouts, the amount of egress traffic used by the one or more source IP addresses and/or egress ports used to transmit the traffic (e.g., for TCP communications), and one or more services provided by the first cloud management service and used to send the traffic that is causing the possible cyber attack. In this manner, a cloud management service may use a standard communication protocol to request restrictions on traffic from another cloud management service, and the other cloud management service may confirm the steps being taken to mitigate the attack along with other relevant information that can be used to prevent such attacks. For example, the requesting cloud management service may flag source IP addresses based on the amount of traffic being sent from a source IP address, and may notify other cloud management services of the flagged source IP addresses to prevent similar attacks at other resources and services provided by other cloud management services.

In one or more embodiments, the communication protocol used to communicate intra-CMP requests and responses may use the Representational State Transfer (REST) protocol or other communication protocols. Using REST may allow for information to be communicated between CMPs using JSON or XML, for example. The request, confirmation, and notification messages may be sent from an active programming interface (API) endpoint of a cloud management service to and API endpoint of another cloud management service.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for detecting and preventing inter-cloud attacks, in accordance with one or more example embodiments of the present disclosure.

Referring to FIG. 1, the process 100 may include devices (e.g., device 102, device 104) for accessing resources from cloud management services (e.g., accessing service 1 from cloud management service 106, accessing service 2 from cloud management service 108). For example, at step 112, the device 102 may send a first request to service 1 (e.g., hosted by the cloud management service 106) to communicate with service 2 using service 1 (e.g., to use a resource of service 1 to send data to service 2). At step 114, the cloud management service 106 may send first egress traffic to service 2 from service 1 (e.g., inter-cloud communications from the cloud management service 106 to the cloud management service 108). The first egress traffic may be in the form of a request (e.g., an application programming interface request for web-based resources provided by the service 2). At step 116, the device 104 may send a second request to service 1 (e.g., hosted by the cloud management service 106) to communicate with service 2 using service 1 (e.g., to use a resource of service 1 to send data to service 2). At step 118, the cloud management service 106 may send second egress traffic to service 2 from service 1 (e.g., inter-cloud communications from the cloud management service 106 to the cloud management service 108). The second egress traffic may be in the form of a request (e.g., an application programming interface request for web-based resources provided by the service 2). For example, service 1 of the cloud management service 106 may provide mechanisms for calling the service 2, such as a HyperText Transfer Protocol (HTTP) request using an application programming interface (API) of service 1. The first and second egress traffic may be legitimate uses of the service 2, such as normal calls for web-based resources (e.g., individual user usage of web-based resources), or may be part of a cyber attack using seemingly legitimate requests (e.g., GET or POST requests) that are part of a coordinated effort of multiple devices to flood/overwhelm the service 2 (e.g., any hardware or software associated with service 2) with tasks to perform in response to the requests.

Still referring to FIG. 1, at step 120, the cloud management service 108 may determine that some egress traffic (e.g., the first egress traffic of step 114) may be part of a coordinated cyber attack, and may determine an address or identifier (e.g., an IP address) of the source of the suspicious egress traffic (e.g., the IP address of the device 102). For example, the cloud management service 108 may detect a DDoS or other cyber attack using any known method (e.g., considering an amount of traffic at a server or API, identifying 503 "service unavailable" errors in response to requests, etc.). Based on the service 1 used to call the service 2, the cloud management service 108 may identify any addresses or identifiers (e.g., IP addresses) of the source devices (e.g., the device 102, the device 104) that are allowed to use the service 1 to call the service 2. The cloud management service 106 may share such address/identifier data with the cloud management service 108. At step 122, the cloud management service 108 may send a request (e.g., blocking request) to the cloud management service 106 to block or otherwise control egress traffic from the cloud management service 106 that is requested by a source with an address (e.g., IP address) indicated by the request. The request may indicate that a cyber attack has been detected by the cloud management service 108 based on egress traffic from the cloud management service 106 using the service 1, and originating with an address of a device (e.g., the IP address of the device 102). To facilitate an inter-cloud communication, the cloud management service 106 at step 124 may send a confirmation message to the cloud management service 108 to indicate that the cloud management service 106 has received the blocking request from step 122 and is evaluating the blocking request.

Still referring to FIG. 1, at step 126, the cloud management service 106 may investigate any address indicated by the blocking request for possible involvement with the cyber attack. In some examples, the cloud management service 106 may block or reroute egress traffic from a device with the source address indicated by the blocking request (as explained further below) automatically without any further analysis of the address (e.g., when the cloud management service 108 is trusted as explained further herein), and in some examples the cloud management service 106 may further evaluate the address to determine whether the address is using egress traffic from the cloud management service 106 to execute a cyber attack on the cloud management service 108. The investigation may include determining past history of traffic from the source address and/or a volume of traffic (e.g., requests to the service 2 using the service 1) over a given time period compared to a threshold amount of traffic. At step 127, the cloud management service 106 may send a third request to the service 1 to communicate with the service 2. When the third request is legitimate (e.g., the cloud management service 106 determines, at step 126, that the IP address of the device 102 is not being used to perform a cyber attack), the third request may be performed as requested. However, when the cloud management service 106 determines, at step 126, that the IP address of the device 102 is being used to perform a cyber attack on the cloud management service 108, at step 128 the cloud management service 106 may block or black hole egress traffic associated with the third request (e.g., prevent any requests from the service 1 to the service 2 based on the third request from being sent). At step 130, the cloud management service 106 may send one or more notification messages to the cloud management service 108 indicating whether the egress traffic from the source address has been blocked or otherwise regulated. In this manner, the cloud management service 106 may notify the cloud management service 108 via inter-cloud communications that the cloud management service 106 is evaluating requests to regulate egress traffic to the cloud management service 108 from some addresses, and that the cloud management service 106 has block or otherwise limited egress traffic to the cloud management service 108 from some addresses.

In one or more embodiments, the recognition of the source of a cyber attack on the cloud management service 108 coming from a resource of the cloud management service 106 (e.g., at step 120) may be differentiated from the cloud management service 108 identifying a DDoS attack from requests that do not come from cloud-based resources managed by another cloud management service (e.g., attacks based on requests that have been routed to the cloud management service 108, but not using another cloud-based network resource provided by anther cloud management service). Instead, the cloud management service 108 may recognize that the cyber attack has been orchestrated using inter-cloud communications (e.g., the first egress traffic at step 114 from the cloud management service 106 to the cloud management service 108). In particular, the egress traffic from one cloud management service to another cloud management service that is used to orchestrate a cyber attack may be differentiated from traffic routed from the device 102 to the cloud management service 108 without calling the service 1 from the cloud management service 106. Indeed, the inter-cloud cyber attack may refer to the use of the service 1 (e.g., a cloud-based computer resource provided by a cloud-based suite of resources managed by the cloud management service 106) to send requests to the service 2 of the cloud management service 108. Rather than the cloud management service 108 mitigating an attack on resources that the cloud management service 108 provides, the cloud management service 108 may use inter-cloud communications with the cloud management service 106 for attack mitigation.

In one or more embodiments, to facilitate the inter-cloud communications (e.g., the blocking request of step 122, the confirmation of step 124, and/or the notification messages of step 130), a messaging protocol or standard may need to be agreed upon by the cloud management service 106 and the cloud management service 108. For example, because the cloud management services may not communicate with one another and may use their own respective messaging protocols for intra-cloud communications (or for inter-cloud communications between the CMP and the device 102 or the device 104, for example), the cloud management services may need to adopt a common messaging protocol for inter-cloud communications. The cloud management services may use REST-based services, for example, between established endpoints at the respective cloud management services, or may establish or adopt a different messaging protocol. The messages may include JSONs, such as JSON used in the blocking request at step 122 to provide the list of addresses suspected as orchestrating the inter-cloud cyber attack. The JSON used in the blocking request at step 122 also may provide a timeout indicating a period of time to block or redirect egress traffic from the source addresses indicated by the blocking request, along with any particular responses such as rate limiting to implement on the egress traffic, and the like. The standard message for the blocking request may indicate the source address, the attacked (e.g., destination) address (e.g., of the service 2), the number of packets/requests sent from the source address to the destination address in a given amount of time, and the like. Such information may be used in the evaluation of step 126, which may supplement the provided information or instead use other information stored by the cloud management service 106, such as call logs, address use history, and the like, to determine past behavior and/or egress traffic volumes and substance of requests originating from any source address.

In one or more embodiments, step 126 may include one or more investigation steps to determine a response to the blocking request. The blocking request may identify the requesting party (e.g., the cloud management service 108, either directly or based on an identifier). The blocking request may include a certificate or token that the cloud management service 106 may use to determine a trust level of the cloud management service 108, or the cloud management service 106 may identify the cloud management service 108 as the blocking requestor and determine a current trust level of the cloud management service 108. The trust level may be pre-evaluated and stored, or may be determined based on any criteria, such as a number of false positives (e.g., previously requested addresses that, after further evaluation, were determined to not have been involved in an attack on the cloud management service 108), or the like. The cloud management service 106 may, in response to the trust level of the cloud management service 108 failing to satisfy a trust level threshold or in addition to the cloud management service 108 satisfying the trust level threshold, evaluate logs to determine whether the volume of egress traffic based on requests from any source address in the blocking request exceeds a volume threshold (e.g., indicating cyber attack involvement). The cloud management service 106 may evaluate other criteria, such as any policies or user preferences, that may govern whether the cloud management service 106 may mitigate an attack by controlling the egress traffic based on requests from any source address indicated in a blocking request.

In one or more embodiments, the response to the blocking request of step 122 may result in any one or more efforts to limit egress traffic from the cloud management service 106. The response may include temporarily or indefinitely blocking egress traffic based on requests from the source address indicated by the blocking request. The response may include temporarily or indefinitely black holing or otherwise rerouting egress traffic based on requests from the source address indicated by the blocking request. The egress traffic may be blocked by an edge device of the cloud management service 106 and/or by a virtual private cloud of the cloud management service 106. As such, as further explained below with respect to FIG. 2, the cloud management service 106 may include one or more services (e.g., in addition to service 1) that may communicate with egress points of the cloud management service 106 to control the flow of egress traffic.

The device 102, the device 104, the cloud management service 106, and/or the cloud management service 108 may include any suitable processor-driven device including, but not limited to, a mobile device or a non-mobile, e.g., a static, device. For example, the device 102, the device 104, the cloud management service 106, and/or the cloud management service 108 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT)

device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 2:
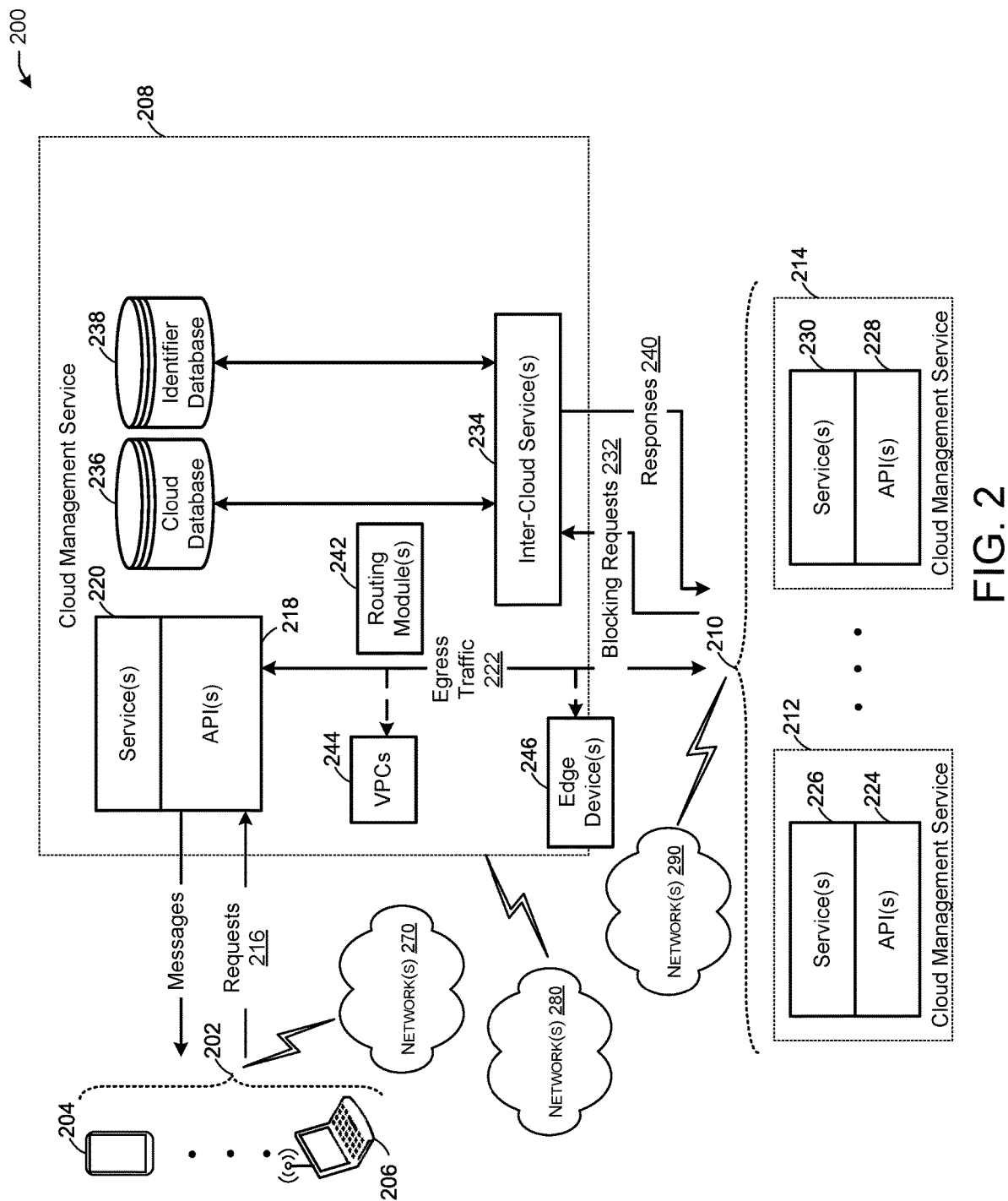
FIG. 2 illustrates a system for detecting and preventing inter-cloud attacks, in accordance with one or more example embodiments of the present disclosure.

FIG. 2 illustrates a system 200 for detecting and preventing inter-cloud attacks, in accordance with one or more example embodiments of the present disclosure.

Referring to FIG. 2, the system 200 may include one or more devices 202 (e.g., device 204, device 206, similar to the device 102 and the device 104 of FIG. 1) in communication with a cloud management service 208 (e.g., similar to the cloud management service 106 of FIG. 1). The cloud management service 208 may communicate with one or more additional cloud management services 210 (e.g., cloud management service 212, cloud management service 214). The one or more devices 202 may send requests 216 (e.g., similar to step 112 and step 116 of FIG. 1) to use one or more resources of the cloud management service 208 (e.g., to call one or more resources of the one or more additional cloud management services 210). The one or more called resources of the cloud management service 210 may include one or more computer-based services 220 (e.g., the service 1 of FIG. 1), which may use respective APIs 218 to send and receive requests and responses. The APIs 218 may send egress traffic 222 (e.g., the egress traffic of step 114 and/or step 118 of FIG. 1) from the cloud management service 208 to the one or more additional cloud management services 210 based on the requests 216 (e.g., based on the content of the requests 216). The egress traffic 222 may be sent to one or more APIs 224 of one or more computer-based services 226 hosted by the cloud management service 212 and/or to one or more APIs 228 of one or more computer-based services 230 of the cloud management service 214.

Still referring to FIG. 2, the one or more additional cloud management services 210 may determine that the egress traffic 222 is being used to orchestrate a cyber attack (e.g., step 120 of FIG. 1). For example, the cloud management service 212 may determine that the egress traffic 222 includes requests to a service of the one or more computer-based services 226 hosted by the cloud management service 212, and that the requests are part of a cyber attack that may overwhelm the resources of the service. For example, the cloud management service 208 may provide the one or more additional cloud management services 210 with addresses (e.g., IP addresses) that are allowed to use the one or more services 220 to communicate with any services of the one or more additional cloud management services 210. The cloud management service 212 may use the information provided by the cloud management service 208 to identify any addresses that may have been used as source addresses for the egress traffic 222. The cloud management service 212 (or any of the one or more additional cloud management services 210) may send blocking requests 232 (e.g., step 122 of FIG. 1) to the cloud management service 208 requesting blocking or otherwise limiting the egress traffic 222 from requests originating from any addresses identified by the blocking requests 232. The blocking requests 232 may be processed by one or more inter-cloud services 234 of the cloud management service 208. The one or more inter-cloud services 234 may facilitate the evaluation of the blocking requests 232 (e.g., step 126 of FIG. 1), the dissemination of information based on the contents of the blocking requests 232, the response to the blocking requests 232 (e.g., as explained further below), and/or the inter-cloud communications between the cloud management service 208 and the one or more additional cloud management services 210 (e.g., the confirmation of step 124 of FIG. 1, the notification of step 130 of FIG. 1, etc.).

Still referring to FIG. 2, the one or more inter-cloud services 234 may communicate with or otherwise have access to a cloud database 236 (e.g., storing information, such as trust information, related to the one or more additional cloud management services 210) and/or to an identifier database 238 (e.g., storing source IP addresses of the one or more devices 202, call log data, user account data, account/address historical usage data, and the like). The one or more inter-cloud services 234 may use the information in the cloud database 236 and/or in the identifier database 238 to evaluate the blocking requests 232 and determine any combination of whether the requesting cloud management service (e.g., the cloud management service of the one or more additional cloud management services 210 that sent a blocking request of the blocking requests 232) satisfies a trust threshold, whether a requested address from a blocking request satisfies a respective trust and/or volume threshold, whether a blocking request may be evaluated and/or responded to, and how to respond to the blocking requests 232 (e.g., blocking the egress traffic 22, black holing the egress traffic 222, rate limiting the egress traffic 222, etc.). Based on the determination of the response to a blocking request, the one or more inter-cloud services 234 may send one or more responses 240 (e.g., step 130 of FIG. 1) indicating the action(s)/respons(es) taken to control the egress traffic 222 originating from any of the one or more devices 202 using any address provided in a blocking request, and/or the amount of traffic involved in the cyber attack (e.g., to allow a cloud management service to adjust criteria for detecting cyber attacks). In addition, the responses 240 may include confirmation messages to the one or more additional cloud management services 210 (e.g., step 124 of FIG. 1) indicating that a blocking request was received. The cloud management service 208 may include one or more routing modules 242 that may facilitate the routing of the egress traffic 222, including the blocking or black holing of the egress traffic 222 as instructed by the one or more inter-cloud services 234. The cloud management service 208 may include one or more VPCs 244 and/or one or more edge devices 246 (e.g., network edge devices) for blocking the egress traffic 222. For example, the one or more routing modules 242 may facilitate blocking of the egress traffic 222 by using the one or more VPCs 244 and/or the one or more edge devices 246 indefinitely or for any amount of time specified by the blocking requests 232.

In one or more embodiments, the blocking requests 232 may identify the cloud management service sending any blocking request (e.g., an IP address of the endpoint used to send the request), source addresses of the perpetrators of the cyber attack, timeouts (e.g., time durations during which the requesting cloud management service requests the cloud management service 208 to restrict or black hole the egress traffic 222 from the cloud management service 208 originated from the source IP addresses), the egress endpoints used to send and receive the blocking request (e.g., respective API endpoints at the cloud management service 212), and the respective inbound and outbound ports of the requesting cloud management service and the cloud management service 208 used in the transmission of the cyber attack traffic. At least some of the information in the request may be included in a JSON payload, for example.

In one or more embodiments, the cloud management service 208 may receive the blocking request from the cloud management service 212 and identify the cloud management service 212 as the requesting cloud management service, the IP addresses whose egress traffic from the cloud management service 208 is to be restricted or black holed (e.g., controlled), a trust level of the cloud management service 212 and/or the IP addresses to be controlled, the timeouts for controlling the egress traffic 222, and other relevant information. When the trust level (or trust score) of the cloud management service 212 exceeds a trust level threshold (or a score threshold, e.g., such as when the requesting user is a government agency or other trusted party), the cloud management service 208 may implement a response to control the egress traffic 222 from the source IP addresses. The decision of whether to implement the response based on the blocking request received from the cloud management service 212 may be based on a decision flow (e.g., decision tree) executed by the one or more inter-cloud services 234. For example, the decision flow may include the comparison of the trust level of the cloud management service 212 to a threshold level, and corresponding actions for when the trust level exceeds or fails to meet the threshold level. When the trust level fails to meet the threshold level, the cloud management service 208 may further evaluate the source IP addresses indicated in the blocking request based on the decision tree. For example, the cloud management service 208 may determine an amount of egress traffic from a source IP address and whether the amount of traffic exceeds a threshold amount of traffic. When the amount of egress traffic from a source IP address exceeds the threshold amount of traffic, the decision flow may include steps for implementing a response to control egress traffic from the source IP address based on the blocking request. When the amount of egress traffic from a source IP address does not exceed the threshold amount of traffic, the decision flow may include steps for further evaluating the source IP address for any suspicious activity (e.g., previously flagged activity, such as traffic exceeding the threshold amount of traffic or the like). The cloud management service 208 may evaluate a number or percentage of false positives of a source IP address (e.g., when the source IP address is indicated incorrectly as participating in a cyber attack) and whether the number or percentage of false positives exceeds a respective threshold.

In one or more embodiments, when the cloud management service 212 does not receive a confirmation (e.g., as one of the responses 240), the cloud management service 212 may re-send the blocking request or may send another similar blocking request. In this manner, a defined inter-cloud communication protocol between cloud management services may allow the cloud management services to communicate in an organized manner to identify and indicate cyber attacks and whether a cloud management service is responding to such an attack.

In one or more embodiments, the blocking requests 232 may indicate to the cloud management service 208 that the cloud management service 212 does not want to receive traffic from one or more source IP addresses or that the cloud management service 212 wants to at least limit the traffic from the one or more source IP addresses (e.g., rate limiting) for a time (e.g., timeout). When the cloud management service 208 determines the response to the blocking request, such as to block, rate limit, or black hole traffic from the one or more source IP addresses, the cloud management service 208 may send a notification (e.g., one of the responses 240) to the cloud management service 212. The notification may provide one or more indications of the response (e.g., which type of control was implemented, and at which of the one or more source IP addresses). The notification may indicate the timeouts, the amount of egress traffic used by the one or more source IP addresses and/or egress ports used to transmit the traffic (e.g., for TCP communications), and one or more services provided by the cloud management service 208 and used to send the traffic that is causing the possible cyber attack. In this manner, a cloud management service may use a standard communication protocol to request restrictions on traffic from another cloud management service, and the other cloud management service may confirm the steps being taken to mitigate the attack along with other relevant information that can be used to prevent such attacks. For example, the requesting cloud management service may flag source IP addresses based on the amount of traffic being sent from a source IP address, and may notify other cloud management services of the flagged source IP addresses to prevent similar attacks at other resources and services provided by other cloud management services.

In one or more embodiments, the communication protocol used to communicate intra-cloud management service requests and responses may use the REST protocol or other communication protocols. Using REST may allow for information to be communicated between cloud management services using JSON or XML, for example. The request, confirmation, and notification messages may be sent from an API endpoint of a cloud management service to and API endpoint of another cloud management service.

The one or more devices 202 may be configured to communicate via a communications network 270, the cloud management service 208 may be configured to communicate via a communications network 280, and/or the one or more additional cloud management services 210 may be configured to communicate via a communications network 290, wirelessly or wired (e.g., the same or different wireless communications networks). The communications network 270, the communications network 280, and/or the communications network 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270, the communications network 280, and/or the communications network 290 may have any suitable communication range associated therewith and may include, for example, global networks (e.g., the Internet), metropolitan area networks (MANs), wide area networks (WANs), local area networks (LANs), or personal area networks (PANs). In addition, communications network 270, and/or the communications network 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more devices 202, the cloud management service 208, and/or the one or more additional cloud management services 210 may include any suitable processor-driven device including, but not limited to, a mobile device or a non-mobile, e.g., a static, device. For example, one or more devices 202, the cloud management service 208, and/or the one or more additional cloud management services 210 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 3:
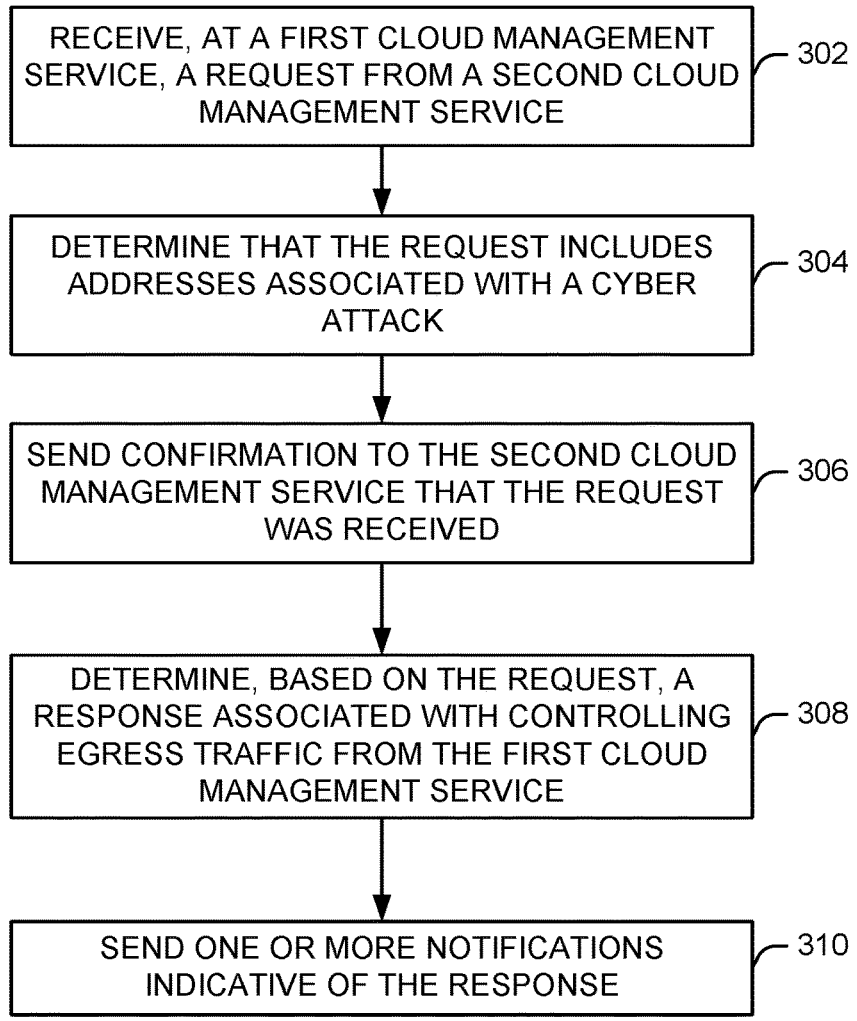
FIG. 3 illustrates a flow diagram for a process for detecting and preventing inter-cloud attacks, in accordance with one or more example embodiments of the present disclosure.

FIG. 3 illustrates a flow diagram for a process 300 for detecting and preventing inter-cloud attacks, in accordance with one or more example embodiments of the present disclosure.

At block 302, a first cloud management system (or device, e.g., the cloud management service 106 of FIG. 1, the cloud management service 208 of FIG. 2) may receive a request (e.g., the request of step 122 of FIG. 1, the blocking requests 232 of FIG. 2) from a second cloud management system (e.g., the cloud management service 108 of FIG. 2, the one or more additional cloud management services 210 of FIG. 2). The second cloud management system may detect a cyber attack based on egress traffic from the first cloud management system to the second cloud management system, and may identify one or more addresses (e.g., IP addresses) used to perform the cyber attack. For example, one or more user devices (e.g., the one or more devices 202 of FIG. 2) may access computer resources (e.g., the one or more computer-based services 220 of FIG. 2) of the first cloud management system to generate traffic (e.g., the egress traffic 222 of FIG. 2) from the first cloud management system to the second cloud management system. The traffic may be part of a cyber attack on the second cloud management system. The second cloud management system may send the request to the first cloud management system to request that one or more addresses (e.g., the IP addresses of the one or more devices 202 of FIG. 2) be blocked, entirely or partially, for at least some period of time (e.g., indefinitely or a period of time specified by the request).

At block 304, the first cloud management system may determine that the request includes addresses associated with a cyber attack. Based on the egress traffic from the first cloud management system to the second cloud management system, the second cloud management system may identify the source address (e.g., IP addresses) of the cyber attack traffic, the first cloud management system's service used to generate the attack, and any other relevant information. For example, the request may indicate the first cloud management service used to generate the cyber attack traffic on the second cloud management service, the second cloud management service that may have been attacked, the second cloud management service, the specific ports/endpoints used (e.g., source and destination) in the cyber attack traffic, and the like.

At block 306, the first cloud management system may send a confirmation (e.g., step 124 of FIG. 1, the responses 240 of FIG. 2) indicating to the second cloud management system that the first cloud management system received the blocking request at block 304, and that the first cloud management system is investigating the addresses and any other information provided by the second cloud management system in the request. The confirmation may be an inter-cloud communication from the first cloud management system to the second cloud management services, allowing one cloud-based network to communicate to another cloud-based network in an effort to prevent the cyber attack. The request at block 304 and the confirmation at block 306 may use a standardized or otherwise agreed upon protocol (e.g., agreed upon by the cloud management systems), such as REST calls or other forms of messages, that allow the CMP systems to communicate with one another. The confirmation and request messages may be sent to agreed upon endpoints in the respective cloud management systems so that such messages are received and processed properly.

At block 308, the first cloud management system may investigate the information in the request of block 302. For example, the first cloud management system may determine, based on the request, a response associated with controlling egress traffic from the first cloud management system to the second cloud management system (e.g., egress traffic from any APIs in the first cloud management system to the second cloud management system) when the traffic originates from any address indicated by the request sent by the second cloud management system. The first cloud management system may determine whether the first cloud management system has the capability to block the egress traffic, how long the first cloud management system may block the egress traffic, and how the first cloud management system will block the egress traffic (if at all). The first cloud management system may consider a trust level of the second cloud management system. For example, if the second cloud management system has a trust level that exceeds a trust threshold, the response by the first cloud management system may be to block the addresses in the request according to any terms in the request (when the first cloud management system has such capability). When the trust level of the second cloud management system does not exceed a trust threshold, the first cloud management system may evaluate traffic from the addresses to determine whether the addresses are generating a volume of traffic that exceeds a traffic threshold, and/or whether the traffic appears to be part of a cyber attack using any other method. When the egress traffic using the addresses of the request does not indicate a cyber attack, the response of the first cloud management system may be to not block the egress traffic. When the egress traffic using the addresses of the request indicates a cyber attack, the response of the first cloud management system may be to block the egress traffic (e.g., entirely, using rate-limiting, black holing, etc.). Blocking may include determining one or more ports used in the traffic of the cyber attack, and blocking the traffic from the one or more ports when the traffic originates from an address identified by the request (or otherwise identified as being involved in the cyber attack). When the request identifies a service that is attacked or whose API may be used in the attack, the first cloud management system may determine the one or more ports that use the service, and may block traffic from the one or more ports when the traffic originates from an address identified by the request (or otherwise identified as being involved in the cyber attack). Responses to identified cyber attacks may be based on location, such as the location of the addresses of the devices causing the cyber attack. The policies and/or criteria used to determine a response (e.g., whether blocking may occur, the duration of blocking, etc.) may be based on a location. Thus, a cyber attack caused by devices in a particular geographic location (e.g., geographic region) may result in a different response than a response to a cyber attack in another geographic location. The response may be based on the service such that one service used in an attack may allow for different types or levels of blocking than another service may allow.

At block 310, the first cloud management system may send one or more notifications (e.g., step 130 of FIG. 1, the responses 240 of FIG. 2) to the second cloud management system to indicate the response. The one or more notifications may indicate whether any address indicated in the request is to be blocked, for how long, and the like. The one or more notifications may include indications of any address in the request, whether a given address was blocked or not, and any other relevant information to notify the second cloud management system that the request sent by the second cloud management system has resulted in a response from the first cloud management system to mitigate the cyber attack on the second cloud management system. The one or more notifications may use a standardized or otherwise agreed upon messaging protocol sent between agreed upon endpoints for the purpose of inter-cloud communications.

Figure 4:
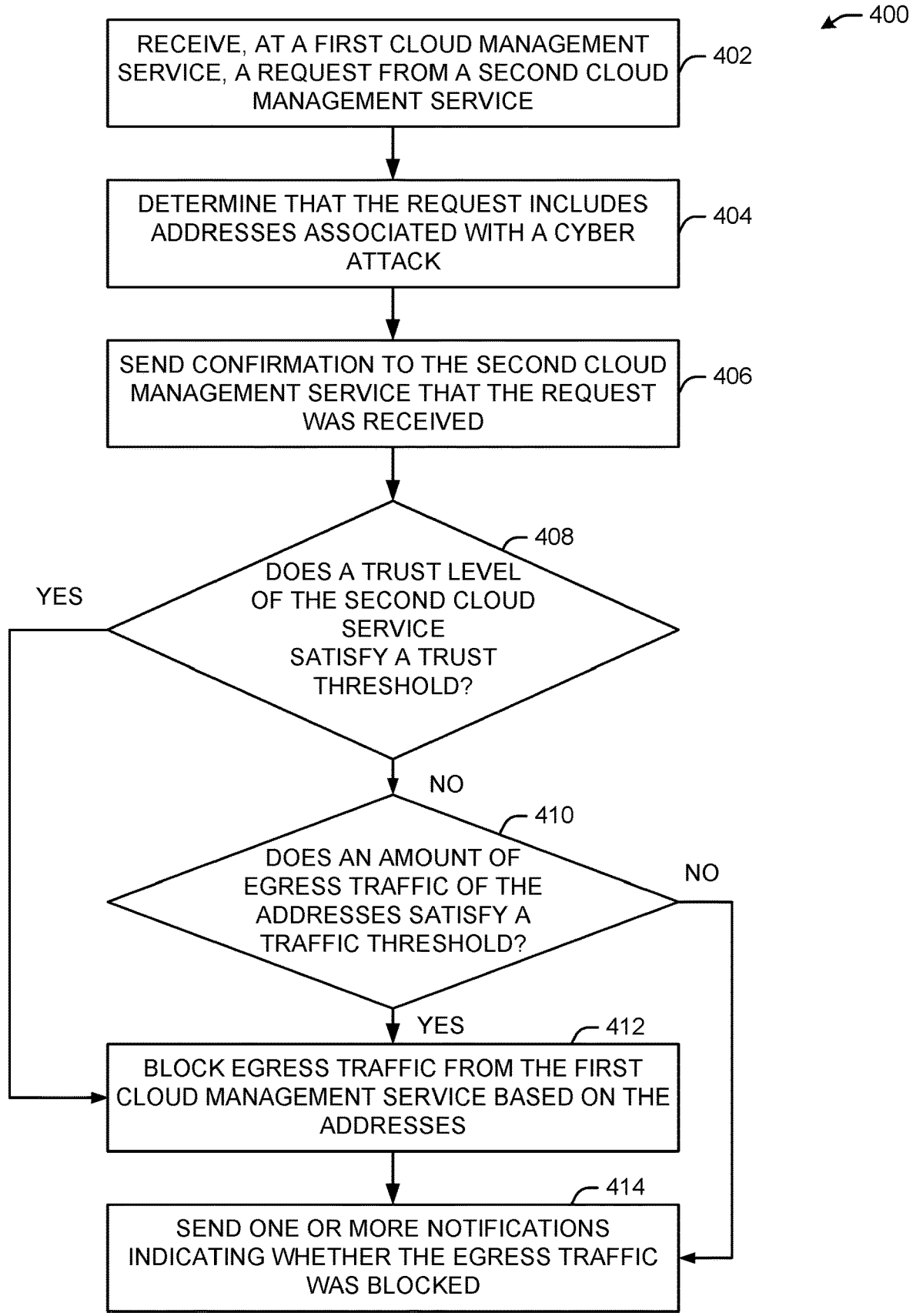
FIG. 4 illustrates a flow diagram for a process for detecting and preventing inter-cloud attacks, in accordance with one or more example embodiments of the present disclosure.

FIG. 4 illustrates a flow diagram for a process 400 for detecting and preventing inter-cloud attacks, in accordance with one or more example embodiments of the present disclosure.

At block 402, a first cloud management system (or device, e.g., the cloud management service 106 of FIG. 1, the cloud management service 208 of FIG. 2) may receive a request (e.g., the request of step 122 of FIG. 1, the blocking requests 232 of FIG. 2) from a second cloud management system (e.g., the cloud management service 108 of FIG. 2, the one or more additional cloud management services 210 of FIG. 2). The second cloud management system may detect a cyber attack based on egress traffic from the first cloud management system to the second cloud management system, and may identify one or more addresses (e.g., IP addresses) used to perform the cyber attack. For example, one or more user devices (e.g., the one or more devices 202 of FIG. 2) may access computer resources (e.g., the one or more computer-based services 220 of FIG. 2) of the first cloud management system to generate traffic (e.g., the egress traffic 222 of FIG. 2) from the first cloud management system to the second cloud management system. The traffic may be part of a cyber attack on the second cloud management system. The second cloud management system may send the request to the first cloud management system to request that one or more addresses (e.g., the IP addresses of the one or more devices 202 of FIG. 2) be blocked, entirely or partially, for at least some period of time (e.g., indefinitely or a period of time specified by the request).

At block 404, the first cloud management system may determine that the request includes addresses associated with a cyber attack. Based on the egress traffic from the first cloud management system to the second cloud management system, the second cloud management system may identify the source address (e.g., IP addresses) of the cyber attack traffic, the first cloud management system's service used to generate the attack, and any other relevant information. For example, the request may indicate the first cloud management service used to generate the cyber attack traffic on the second cloud management service, the second cloud management service attacked, the second cloud management system, the specific ports/endpoints used (e.g., source and destination) in the cyber attack traffic, and the like.

At block 406, the first cloud management system may send a confirmation (e.g., step 124 of FIG. 1, the responses 240 of FIG. 2) indicating to the second cloud management system that the first cloud management system received the blocking request at block 404, and that the first cloud management system is investigating the addresses and any other information provided by the second cloud management system in the request. The confirmation may be an inter-cloud communication from the first cloud management system to the second cloud management system, allowing one cloud-based network to communicate to another cloud-based network in an effort to prevent the cyber attack. The request at block 404 and the confirmation at block 406 may use a standardized or otherwise agreed upon protocol (e.g., agreed upon by the cloud management systems), such as REST calls or other forms of messages, that allow the cloud management systems to communicate with one another. The confirmation and request messages may be sent to agreed upon endpoints in the respective cloud management systems so that such messages are received and processed properly.

At block 408, the first cloud management system may determine whether a trust level of the second cloud management system satisfies a trust threshold. The trust level may be determined by using a certificate or token indicative of the second cloud management system, allowing the first cloud management system to identify the second cloud management system and determine a trust level of the second cloud management system. The trust level may be determined by evaluating previous requests from the second cloud management system, and whether the blockage rate and/or false positive rate of the requests satisfy respective thresholds. When the trust level of the second cloud management system does not exceed a trust threshold, the process 400 may continue to block 410. When the second cloud management system has a trust level that exceeds a trust threshold, process 400 may continue to block 412.

At block 410, the first cloud management system may further investigate the any address indicated by the request for possible involvement in the alleged cyber attack. The first cloud management system may determine whether an amount of egress traffic from the first cloud management system, originating from a device at an address indicated by the request, satisfies a traffic threshold and/or meets other traffic criteria (e.g., the type and/or size of a request originating from the device and using a service of the first cloud management system to generate egress traffic to the second cloud management system). When the amount of egress traffic from the first cloud management system, originating from a device at an address indicated by the request, satisfies a traffic threshold and/or meets other traffic criteria, the process 400 may continue to block 412. When the amount of egress traffic from the first cloud management system, originating from a device at an address indicated by the request, fails to satisfy a traffic threshold and/or fails to meet other traffic criteria, the process 400 may continue to block 414.

At block 412, the response by the first cloud management system may be to block the addresses in the request according to any terms in the request (when the first cloud management system has such capability). The blocking may be partially (e.g., rate limiting) or entirely, for a specified time period (e.g., a default time period, a time period determined by the first cloud management system based on the amount of traffic or past offenses by the device at a requested address, or a time period specified by the request).

At block 414, the first cloud management system may send one or more notifications (e.g., step 130 of FIG. 1, the responses 240 of FIG. 2) to the second cloud management system to indicate the response. The one or more notifications may indicate whether any address indicated in the request is to be blocked, for how long, and the like. The one or more notifications may include indications of any address in the request, whether a given address was blocked or not, and any other relevant information to notify the second cloud management system that the request sent by the second cloud management system has resulted in a response from the first cloud management system to mitigate the cyber attack on the second cloud management system. The one or more notifications may use a standardized or otherwise agreed upon messaging protocol sent between agreed upon endpoints for the purpose of inter-cloud communications.

Figure 5:
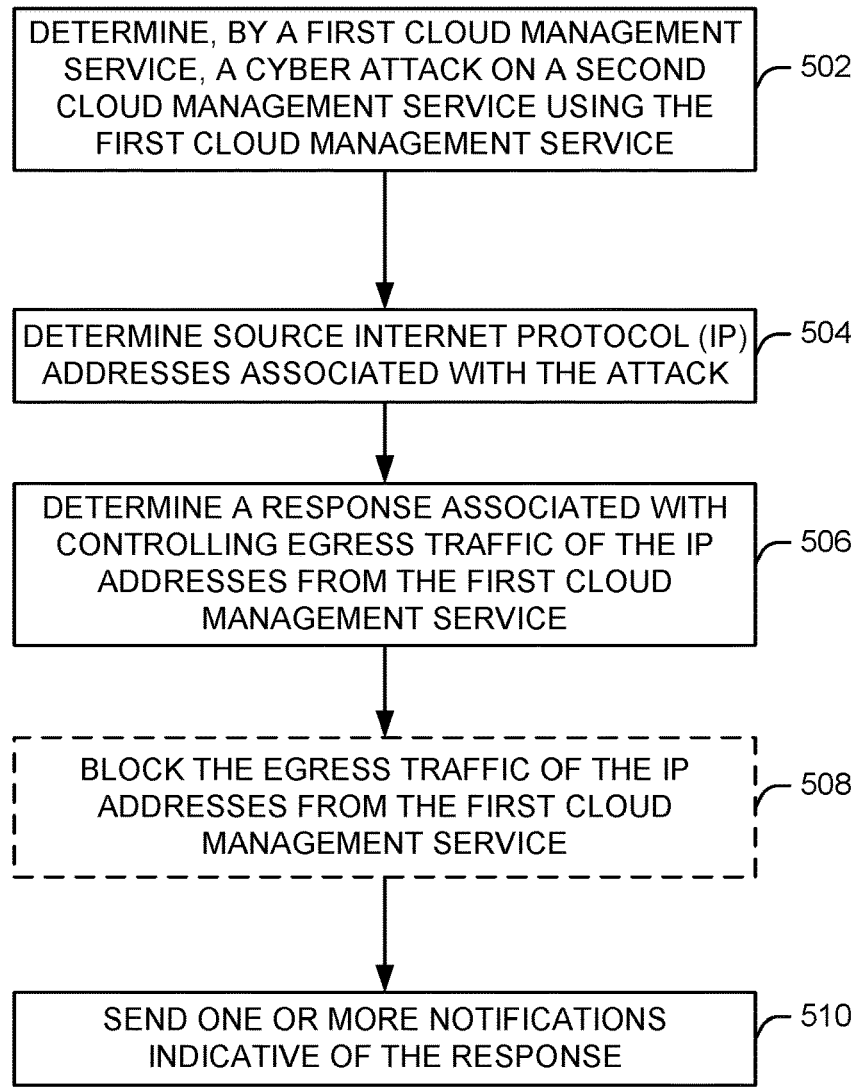
FIG. 5 illustrates a flow diagram for a process for detecting and preventing inter-cloud attacks, in accordance with one or more example embodiments of the present disclosure.

FIG. 5 illustrates a flow diagram for a process 500 for detecting and preventing inter-cloud attacks, in accordance with one or more example embodiments of the present disclosure.

At block 502, a first cloud management system (or device, e.g., the cloud management service 106 of FIG. 1, the cloud management service 208 of FIG. 2) may determine that a cyber attack on a second cloud management system (e.g., the cloud management service 108 of FIG. 2, the one or more additional cloud management services 210 of FIG. 2) may occur using resources (e.g., the one or more services 220 of FIG. 2) of the first cloud management system. In particular, the first cloud management system may identify a cyber attack on the second cloud management system using resources of the first cloud management system without the second cloud management system requesting blocking of any devices/addresses. The first cloud management system may evaluate data, such as call logs, of any devices/accounts using source addresses (e.g., IP addresses), and may determine that the volume and/or nature of egress traffic from the first cloud management system to the second cloud management system (or between particular respective services/APIs of the cloud management system) based on calls originating from a device address exceed a threshold and/or meet other criteria indicative of a cyber attack.

At block 504, the first cloud management system may determine the addresses of the devices associated with a cyber attack. Based on the egress traffic from the first cloud management system to the second cloud management system, the first cloud management system may identify the source address (e.g., IP addresses) of the cyber attack traffic, the first cloud management system's service used to generate the attack, and any other relevant information. The first cloud management system may evaluate call logs to identify the calls made in the egress traffic, and the addresses of the devices that made the calls.

At block 506, the first cloud management system may determine a response associated with controlling egress traffic from the first cloud management system to the second cloud management system (e.g., egress traffic from any APIs in the first cloud management system to the second cloud management system) when the traffic originates from any address indicated by the request sent by the second cloud management system. The first cloud management system may determine whether the first cloud management system has the capability to block the egress traffic, how long the first cloud management system may block the egress traffic, and how the first cloud management system will block the egress traffic (if at all). When the egress traffic using the addresses of the request does not indicate a cyber attack, the response of the first cloud management system may be to not block the egress traffic. When the egress traffic using the addresses of the request indicates a cyber attack, the response of the first cloud management system may be to block the egress traffic (e.g., entirely, using rate-limiting, black holing, etc.).

At block 508, the first cloud management system optionally may block egress traffic from the first cloud management system to the second cloud management system, the egress traffic originating from any address indicated by the request of block 502. When the response of block 506 is to block the egress traffic, then the first cloud management system may implement the blocking at block 508. When the response of block 506 is to not block some traffic, then the first cloud management system may skip block 508 (e.g., for a given address).

At block 510, first cloud management system send one or more notifications (e.g., step 130 of FIG. 1, the responses 240 of FIG. 2) to the second cloud management system to indicate the response. The one or more notifications may indicate whether any address indicated in the request is to be blocked, for how long, and the like. The one or more notifications may include indications of any address in the request, whether a given address was blocked or not, and any other relevant information to notify the second cloud management system that the request sent by the second CMP system has resulted in a response from the first cloud management system to mitigate the cyber attack on the second cloud management system. The one or more notifications may use a standardized or otherwise agreed upon messaging protocol sent between agreed upon endpoints for the purpose of inter-cloud communications.

These examples are not meant to be limiting.

Figure 6:
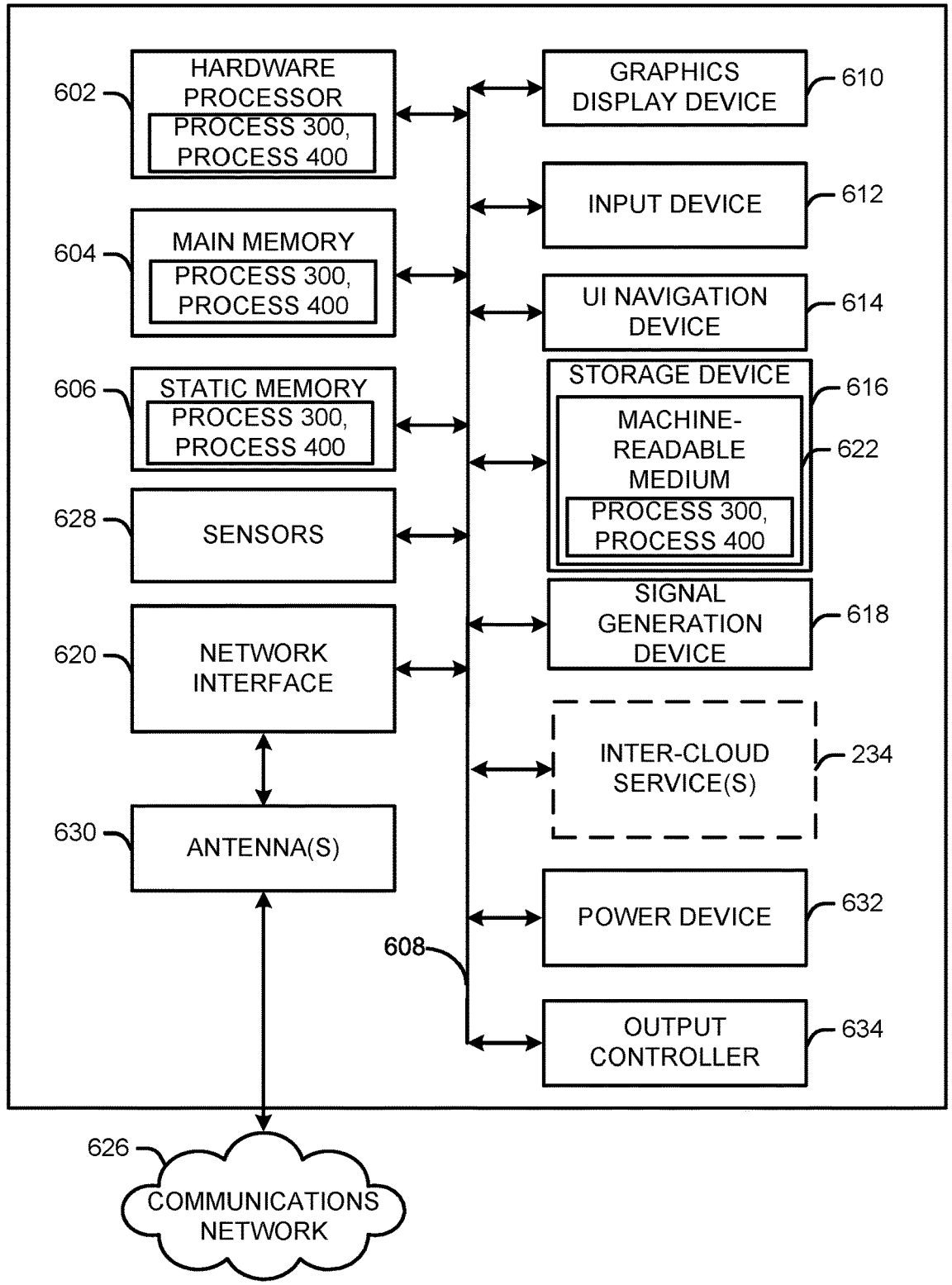
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 or system (e.g., the device 102 of FIG. 1, the device 104 of FIG. 1, the cloud management service 106 of FIG. 1, the cloud management service 108 of FIG. 1, the one or more devices 202 of FIG. 2, the cloud management service 208 of FIG. 2, the one or more additional cloud management services 210 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the one or more inter-cloud services 234 of FIG. 2 (e.g., one or more modules capable of performing the process 300 of FIG. 3, the process 400 of FIG. 4, and/or the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions (e.g., software to implement process 300 of FIG. 3 and/or process 400 of FIG. 4) embodying or utilized by any one or more of the techniques or functions described herein. The instructions may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices;

magnetic disks, such as internal hard disks and removable disks; magneto-optical disks; and CD-ROM and DVD-ROM disks.

The instructions may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving, at a first endpoint of a first cloud management service, a request from a second endpoint of a second cloud management service, the request indicative of a distributed denial of service (DDoS) attack on the second cloud management service using the first cloud management service;
determining that the request comprises two or more source Internet protocol (IP) addresses associated with the DDoS attack;
sending a confirmation to the second cloud management service that the request was received;
determining, based on the second cloud management service, a trust level associated with the request;
determining, based on the trust level, a response associated with controlling egress traffic from the first cloud management service, the egress traffic associated with the two or more source IP addresses; and
sending a notification to the second cloud management service, the notification comprising an indication of the response.

2. The method of claim 1, further comprising determining that the trust level exceeds a trust level threshold, wherein determining the response is based on the determination that the trust level exceeds the trust level threshold.

3. The method of claim 1, further comprising:
determining that the trust level fails to meet a trust level threshold; and
determining, based on the determination that the trust level fails to meet the trust level threshold, an amount of traffic associated with the two or more source IP addresses,
wherein determining the response is based on the amount of traffic.

4. The method of claim 1, further comprising:
determining an amount of traffic associated with the two or more source IP addresses;
determining, based on the amount of traffic, a use restriction associated with the two or more IP addresses; and
determining a time period during which the use restriction is to be applied,
wherein the indication of the response is indicative of the use restriction and the time period.

5. A method comprising:
receiving, by a first network management service, a request from a second network management service, the request indicative of a cyber attack on a second network management service using the first network management service;
determining that the request comprises two or more source Internet protocol (IP) addresses associated with the cyber attack;
determining, based on the request, a response to the cyber attack, the response associated with controlling egress traffic from the first network management service, the egress traffic associated with the two or more source IP addresses; and
sending a notification to the second network management service, the notification comprising an indication of the response.

6. The method of claim 5, wherein the cyber attack is a distributed denial of service (DDoS) attack.

7. The method of claim 5, further comprising sending a confirmation to the second network management service that the request was received.

8. The method of claim 5, wherein the request comprises an IP address associated with the second network management service and one or more timeouts associated with the response and the two or more source IP addresses, wherein determining the response is based on the one or more timeouts.

9. The method of claim 5, wherein the request further comprises indication of ports associated with the cyber attack, wherein the response is associated with controlling egress traffic at the ports.

10. The method of claim 5, further comprising determining a score associated with the second network management service, wherein determining the response is further based on the score.

11. The method of claim 10, further comprising determining that the score exceeds a score threshold, wherein determining the response is based on the determination that the score exceeds the score threshold.

12. The method of claim 10, further comprising:
determining that the score fails to meet a score threshold; and
determining, based on the determination that the score fails to meet the score threshold, an amount of traffic associated with the two or more IP addresses,
wherein determining the response is based on the amount of traffic.

13. The method of claim 5, further comprising determining a geographic region associated with the cyber attack, wherein determining the response is based on the geographic region.

14. The method of claim 5, further comprising generating the notification, the notification further comprising indications of an amount of egress traffic used by the two or more source IP addresses in the cyber attack.

15. The method of claim 5, further comprising determining a service associated with the cyber attack, wherein the first network management service provides the service, wherein determining the response is based on the service.

16. The method of claim 5, further comprising generating the notification, the notification further comprising an indication of a service associated with the cyber attack.

17. A method, comprising:
detecting, by a first network management service, a cyber attack on the first network management service, the cyber attack performed using a second network management service;
determining two or more source Internet protocol (IP) addresses associated with the cyber attack;
generating a request indicative of the cyber attack, the request comprising the two or more IP addresses and an indication of the first network management service;
sending the request from a first application programming interface (API) endpoint of the first network management service to a second API endpoint of the second network management service;
receiving, at the first API endpoint and from the second API endpoint, a confirmation that the request was received; and
receiving, at the first API endpoint and from the second API endpoint, a notification comprising an indication of a response associated with controlling egress traffic from the second network management service, the egress traffic associated with the two or more source IP addresses.

18. The method of claim 17, further comprising determining, based on the two or more source IP addresses, a service associated with the second network management service.

19. The method of claim 17, further comprising determining one or more timeouts associated with controlling traffic associated with the two or more source IP addresses, the request further comprising an indication of the one or more timeouts.

20. The method of claim 17, further comprising determining, based on the notification, an amount of egress traffic used by the two or more source IP addresses in the cyber attack.

* * * * *